United States Patent
Nakajima

(10) Patent No.: US 10,108,170 B2
(45) Date of Patent: Oct. 23, 2018

(54) NUMERICAL CONTROLLER PERFORMING RECIPROCAL TURNING IN COMPLEX FIXED CYCLE

(71) Applicant: FANUC Corporation, Minamitsuru-gun, Yamanashi (JP)

(72) Inventor: Osamu Nakajima, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 284 days.

(21) Appl. No.: 15/063,535

(22) Filed: Mar. 8, 2016

(65) Prior Publication Data

US 2016/0274560 A1    Sep. 22, 2016

(30) Foreign Application Priority Data

Mar. 19, 2015   (JP) .................. 2015-056670

(51) Int. Cl.
| | |
|---|---|
| B23B 33/00 | (2006.01) |
| G05B 19/18 | (2006.01) |
| B23B 29/26 | (2006.01) |
| B23B 3/06 | (2006.01) |

(52) U.S. Cl.
CPC ............. G05B 19/188 (2013.01); B23B 3/06 (2013.01); B23B 29/26 (2013.01); *G05B 2219/45136* (2013.01)

(58) Field of Classification Search
CPC ................................. B23B 33/00; B23B 1/00
See application file for complete search history.

(56) References Cited

U.S. PATENT DOCUMENTS

| | | | | |
|---|---|---|---|---|
| 5,152,201 | A | 10/1992 | Izawa | |
| 9,581,991 | B2* | 2/2017 | Nakajima | ............... G05B 19/18 |
| 9,862,094 | B2* | 1/2018 | Nakajima | ............... B25J 9/1666 |

(Continued)

FOREIGN PATENT DOCUMENTS

| | | | |
|---|---|---|---|
| JP | S57-107703 A | | 7/1982 |
| JP | H02-30404 A | | 1/1990 |

(Continued)

OTHER PUBLICATIONS

Machine English Translation of JPH0230404A, Detailed Description.*

(Continued)

*Primary Examiner* — Nicholas Tobergte
(74) *Attorney, Agent, or Firm* — Drinker Biddle & Reath LLP

(57) ABSTRACT

A numerical controller controls a machine tool that performs a turning on a workpiece on the basis of a cycle instruction indicated by an NC program. The machine tool includes first and second cutter holders that are mutually coupled by a coupling member, and first and second tools are mounted on the cutter holders in mutually opposing fashion. The machine tool performs a turning according to a complex fixed cycle, in a reciprocal fashion rather than unidirectionally, using the first and second tools, and when the turning by the first tool has been completed and the first tool that has performed a turning is withdrawn, it is possible to perform a turning in the opposite direction by the second tool on the opposite side.

4 Claims, 8 Drawing Sheets

(56) References Cited

U.S. PATENT DOCUMENTS

| | | |
|---|---|---|
| 2006/0095155 A1 | 5/2006 | Shibui |
| 2015/0012125 A1* | 1/2015 | Haga |
| 2017/0242422 A1* | 8/2017 | Ito .............................. B23B 5/16 |
| 2017/0277162 A1* | 9/2017 | Nakajima ............. G05B 13/026 |

FOREIGN PATENT DOCUMENTS

| | | |
|---|---|---|
| JP | H02-152701 A | 6/1990 |
| JP | H04-606 A | 1/1992 |
| JP | 2002-341915 A | 11/2002 |
| JP | 2004-58227 A | 2/2004 |
| JP | 2011-237880 A | 11/2011 |
| JP | 2014-195856 A | 10/2014 |
| JP | 2015-011669 A | 1/2015 |

OTHER PUBLICATIONS

Machine English Translation of JPH04606A, Detailed Description.*

Machine English Translation of JP021522701, Detailed Description.*

Notification of Reasons for Refusal dated Apr. 11, 2017 in Japanese Patent Application No. 2015-056670 (4 pages) with an English translation (4 pages).

* cited by examiner

NUMERICAL CONTROLLER PERFORMING RECIPROCAL TURNING IN COMPLEX FIXED CYCLE

RELATED APPLICATION DATA

This application claims priority under 35 U.S.C. § 119 and/or § 365 to Japanese Application No. 2015-056670 filed Mar. 19, 2015, the entire contents is incorporated herein by reference.

BACKGROUND OF THE INVENTION

1. Field of the Invention

The present invention relates to a numerical controller capable of shortening the cycle time in a turning based on a composite fixed cycle.

2. Description of the Related Art

A numerical controller reads out a processing program stored in a memory, and controls a machine tool by driving a servo motor and a spindle motor in accordance with this processing program.

A complex fixed cycle command in a numerical controller programs a workpiece machining pattern and performs a turning in accordance with this workpiece processing program. As shown in FIG. 9, in a cycle operation, the following actions are carried out: (1) positioning at start point (A) of turning; (2) cutting by tool t; (3) withdrawal operation from workpiece; and (4) positioning of workpiece W again at start point; and the actions (1) to (4) are repeated until machining of the workpiece W is completed.

As an example of prior art relating to cycle machining of this kind, Japanese Patent Application Laid-Open No. 2015-011669 discloses a numerical controller having a start point path shortening function for a complex fixed cycle, wherein processing is carried out to set a linear path from a cutting end position of the cycle to a cutting start position of a next cycle, in a complex fixed cycle, thereby shortening the cycle time of the complex fixed cycle.

Furthermore, Japanese Patent Application Laid-Open No. 2014-195856 discloses machining of a shaft-like member, wherein a first tool and a second tool are held on a common tool holder so as to have a positional relationship in which the respective tip sections thereof are displaced by 180°, and the tip sections of the first tool and the second tool are then arranged in a groove formed in the shaft-like member, and while the shaft-like member is rotated about the central axis thereof, the tip sections of the first tool and the second tool are moved in the direction of the central axis from inside the groove, and the outer circumferential surface of the shaft-like member is cut (turned) by the first tool and the second tool.

However, in the operation of the turning shown in FIG. 9, the direction of the turning is unidirectional, and therefore when the turning of one cycle has been completed, it is necessary to return the tool to the start point of the turning in order to carry out the turning of the next cycle. Time unrelated to the turning is necessary for the operation of returning to the start point, and hence there is a problem in that the cycle time becomes correspondingly longer.

In practice, the technology disclosed in Japanese Patent Application Laid-Open No. 2015-011669 described above contributes to a certain extent to improving the cycle time, but the direction of the turning direction remains unidirectional and furthermore, when making a cutting insertion, since the next turning is carried out after returning through the distance that has been cut, then there remains a problem in that time is always required to return to position.

Moreover, in the technology disclosed in Japanese Patent Application Laid-Open No. 2014-195856 described above, since the two tools move and perform turning in the same direction, then the turning direction is still unidirectional, and furthermore, when making a cutting insert, since the next turning is carried out after returning through the distance that has been cut, then there is a problem in that time is always required to return to position.

SUMMARY OF THE INVENTION

It is an object of the present invention to provide a numerical controller capable of shortening the cycle time in a turning based on a composite fixed cycle.

A numerical controller according to the present invention controls a machine tool that performs a turning on a workpiece on the basis of a cycle instruction indicated by an NC program. The machine tool includes: a first tool that performs a turning on the workpiece while moving in a first machining direction; a second tool that performs a turning on the workpiece while moving in a second machining direction opposite to the first machining direction; and a tool switching unit that switches, based on an instruction from the numerical controller, the tool used for a turning to an instructed tool, from among the first tool and the second tool, and establishes a state where a turning can be implemented by the tool. The numerical controller includes a cycle operation creation unit that creates, on the basis of the cycle instruction, a cycle operation for instruction to the machine tool. The cycle operation is an operation that repeats a reciprocal turning operation including: a first operation for performing a turning in the first machining direction by the first tool; a second operation for switching from the first tool to the second tool by the tool switching unit; a third operation for performing a turning in the second machining direction by the second tool; and a fourth operation for switching from the second tool to the first tool by the tool switching unit.

The tool switching unit may be configured by: a first cutter holder on which the first tool is mounted; a second cutter holder on which the second tool is mounted; a coupling member that couples the first cutter holder and the second cutter holder in such a manner that the first tool and the second tool are arranged in substantially opposing fashion on either side of the axis of a spindle that causes the workpiece to rotate; and a motor that drives the first cutter holder and the second cutter holder in a direction substantially perpendicular to the axis of the spindle; and the second operation may be an operation for causing the second tool to move to a position where the workpiece is to be machined, by moving the first tool away from the workpiece; and the fourth operation may be an operation for causing the first tool to move to a position where the workpiece is to be machined, by moving the second tool away from the workpiece.

The tool switching unit may be configured by: a turret on which the first tool and the second tool are mounted; and a motor that drives the turret; and the second operation may be an operation of indexing the second tool by rotating the turret and then moving the second tool to a position where the workpiece is to be machined; and the fourth operation may be an operation of indexing the first tool by rotating the turret and then moving the first tool to a position where the workpiece is to be machined.

The tool switching unit may be configured by: a tandem cutter holder on which the first tool and the second tool are mounted, and a drive unit that drives the tandem cutter holder; the second operation may be an operation of indexing the second tool by driving the tandem cutter holder and then moving the second tool to a position where the workpiece is to be machined, and the fourth operation may be an operation of indexing the first tool by driving the tandem cutter holder and then moving the first tool to a position where the workpiece is to be machined.

According to the present invention, it is possible to reduce movement of the tools to the minimum necessary amount, and therefore the cycle time is shortened, and improved productivity can be expected due to the shortening of the cycle time.

BRIEF DESCRIPTION OF THE DRAWINGS

The abovementioned and further objects and characteristic features of the present invention will become evident from the following description of the embodiments with reference to the drawings, in which:

FIG. 1B is caused to perform by the numerical controller according to the first embodiment of the present invention;

FIG. 1B is caused to perform reciprocal turning according to the complex fixed cycle shown in FIG. 2;

DETAILED DESCRIPTION OF THE PREFERRED EMBODIMENTS

Firstly, a numerical controller according to a first embodiment of the present invention will be described with reference to FIG. 1 to FIG. 5.

Figure 1A:
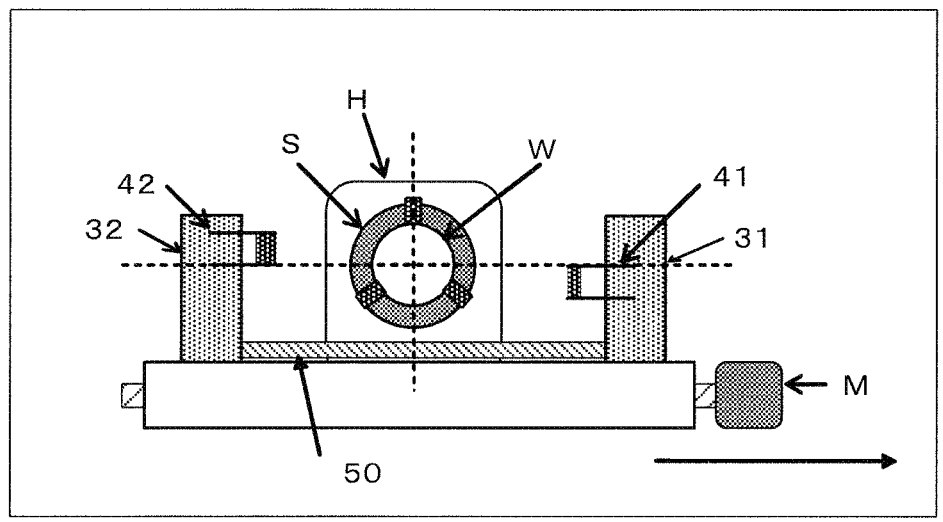
FIGS. 1A and 1B are schematic drawings of a machine tool which is controlled by a numerical controller according to a first embodiment of the present invention.
Figure 1B:
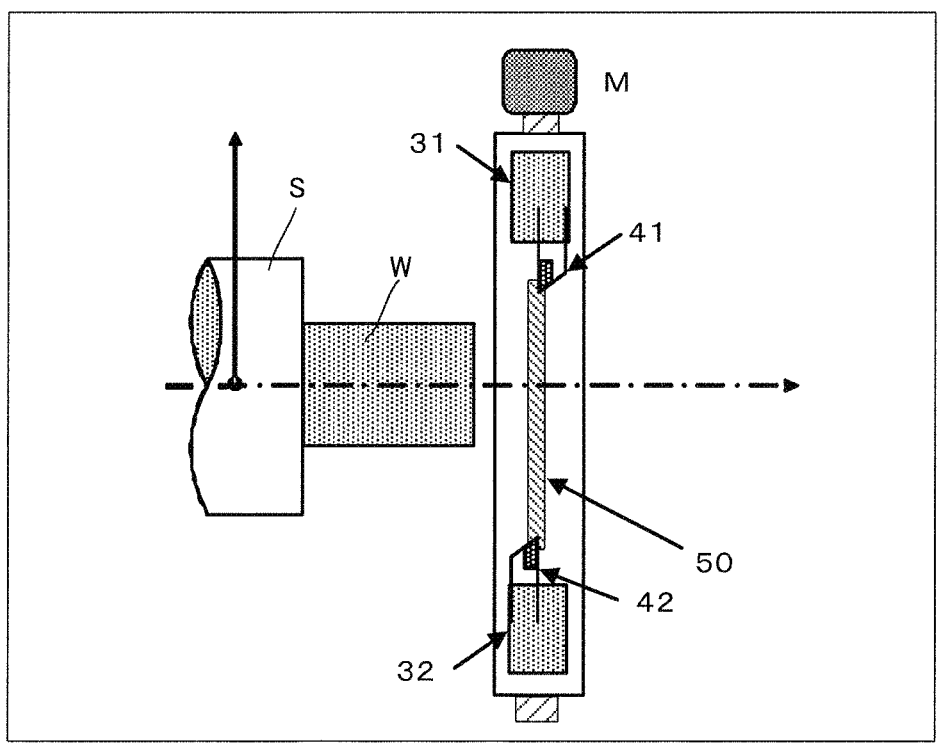

A machine tool which is controlled by the numerical controller is described here with reference to FIG. 1A and FIG. 1B.

The machine tool is provided with a first cutter holder 31 and a second cutter holder 32 which are mutually coupled by a coupling member 50, and first and second tools 41, 42 are mounted on the first and second cutter holders 31, 32 so as to be mutually opposing. This machine tool carries out a turning in a complex fixed cycle using the first and second tools 41, 42, by reciprocal movement rather than unidirectionally, and since the first and second cutter holders 31, 32 which are mutually opposing are coupled by the coupling member 50, then when the turning by the first tool 41 is finished and the first tool 41 which has performed a turning is withdrawn, a turning can be performed in the opposite direction by the second tool 42 on the opposite side.

In FIG. 1A and FIG. 1B, reference symbol M indicates a motor, W indicates a workpiece, S indicates a spindle and H indicates a spindle holder.

A reciprocal turning procedure based on a complex fixed cycle which the machine tool shown in FIG. 1A and FIG. 1B is caused to perform by the numerical controller according to the first embodiment of the present invention will now be described with reference to FIG. 2.

Figure 9:
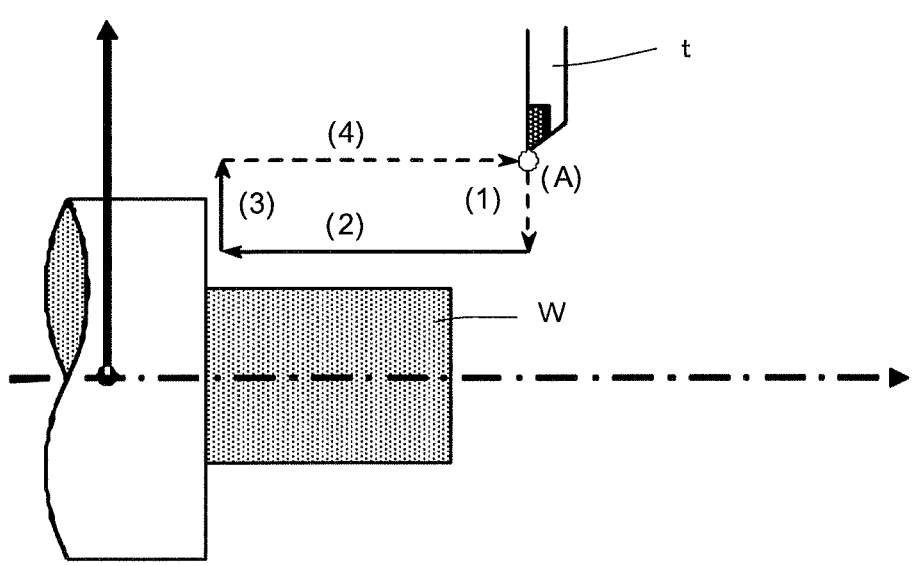
FIG. 9 is a diagram illustrating a control operation of cycle machining according to the prior art.

Step 1: An amount of movement determined from the current position of the first tool 41 and the depth of cut in one operation for machining the workpiece W is instructed to the first tool 41, and while the first tool 41 is advanced towards the workpiece W by this amount of movement at a fast feed speed ((1)), the second tool 42 on the opposite side is simultaneously separated from the workpiece W through the same amount of movement, at a fast feed speed, by an instruction to the first tool 41 ((1)'). According to this operation, the cycle operation (1) and operation (3) in FIG. 9 are performed simultaneously, and therefore the cycle time is shortened.

Step 2: The distance from the start point to the end point of machining of the workpiece W instructed by the program is instructed to the first tool 41, and while the first tool 41 is carrying out a turning through the instructed distance at a cutting speed ((2)), the second tool 42 on the opposite side simultaneously moves through the same amount of movement at the cutting speed, due to the instruction to the first tool 41 ((2)'). According to this operation, the operation (2) and operation (4) in FIG. 9 are performed simultaneously, and therefore the cycle time is shortened.

Step 3: An amount of movement which is the sum of the depth of cut in one operation for machining the workpiece W and the distance between the cutting tips of the first tool 41 and the second tool 42 (called L below) minus the difference in the depth of cut (referred to below as $(A(X)-(U \times n)) \times 2$), is instructed to the first tool 41, and while the second tool 42 is advanced towards the workpiece W through this amount of movement at a fast feed speed ((3)'), the first tool 41 on the opposite side is simultaneously separated from the workpiece W through the same amount of movement, at a fast feed speed ((3)). According to this operation, the operation (1) and operation (3) in FIG. 9 are performed simultaneously, and therefore the cycle time is shortened.

Step 4: The distance from the start point to the end point of the machining of the workpiece W which is indicated by the program is instructed to the first tool 41, and while the second tool 42 performs a turning through the instructed distance at the cutting speed due to the instruction to the first tool 41 ((4)'), the first tool 41 on the opposite side simultaneously moves through the same amount of movement at the cutting speed ((4)). According to this operation, the operation (2) and operation (4) in FIG. 9 are performed simultaneously, and therefore the cycle time is shortened.

Figure 2:
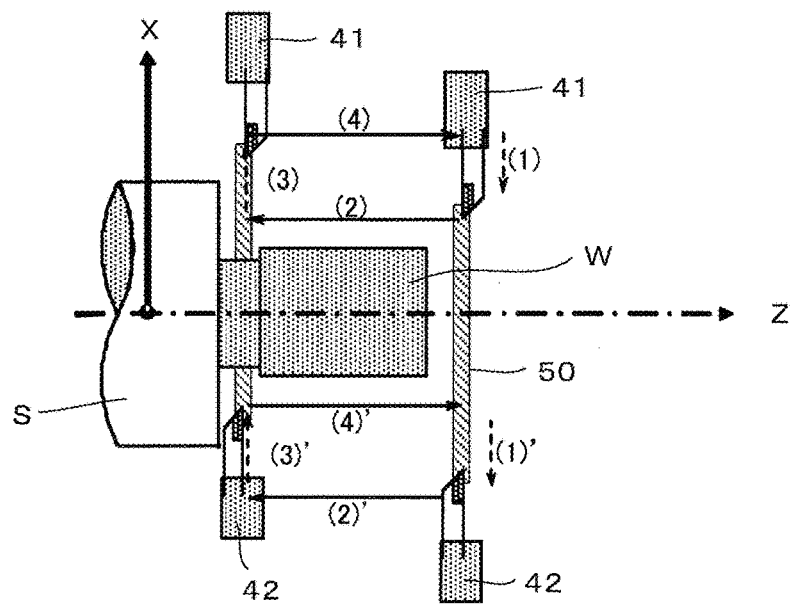
FIG. 2 is a diagram illustrating a reciprocal turning procedure based on a complex fixed cycle which the machine tool shown in FIG. 1A
Figure 3:
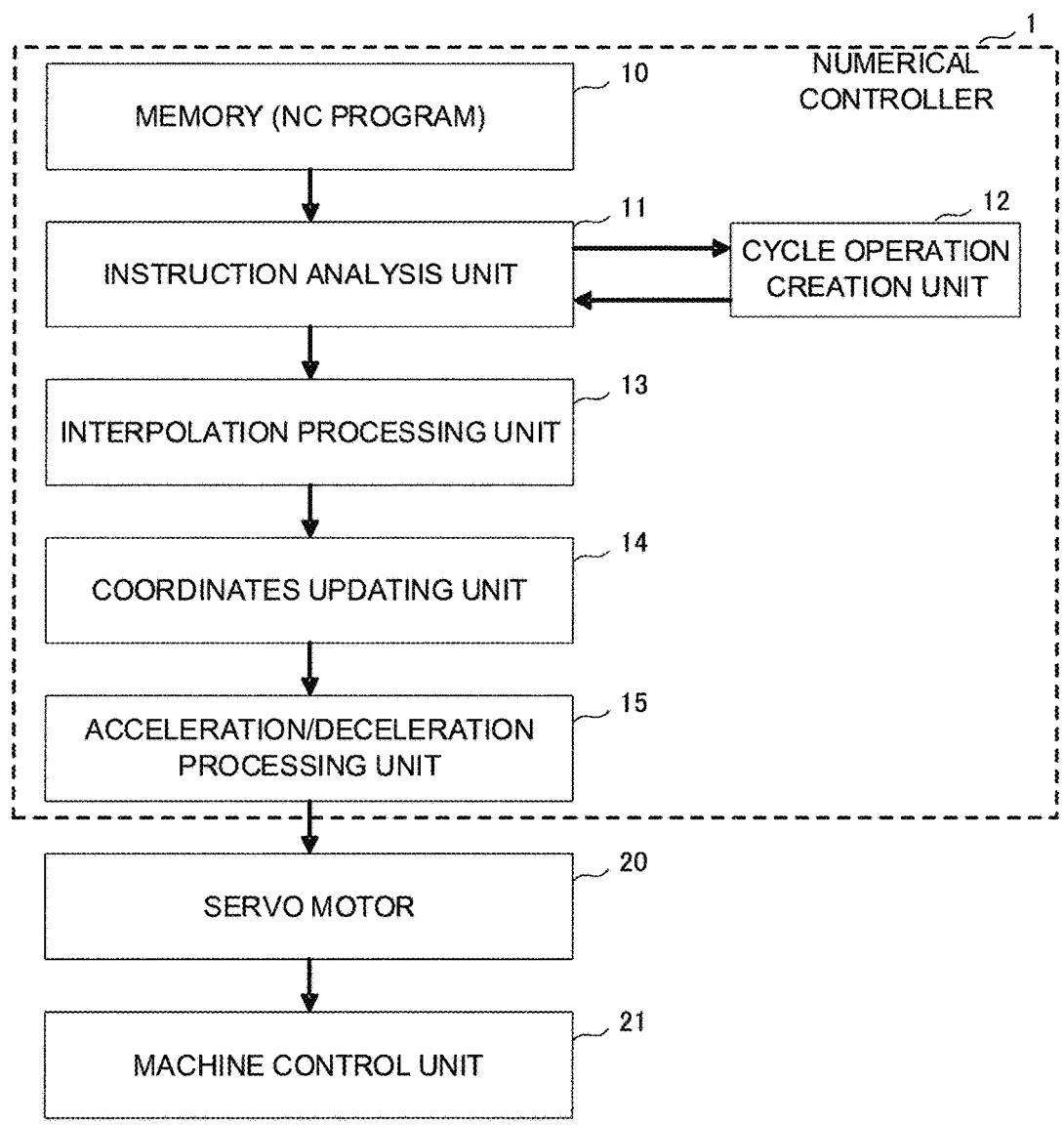
FIG. 3 is a principal block diagram of a numerical controller according to a first embodiment of the present invention, wherein the machine tool shown in FIG. 1A

FIG. 3 is a principal block diagram of a numerical controller according to a first embodiment of the present invention, wherein the machine tool shown in FIG. 1A and FIG. 1B is caused to perform reciprocal turning according to the complex fixed cycle shown in FIG. 2.

The numerical controller 1 is provided with a memory 10, an instruction analysis unit 11, a cycle operation creation unit 12, an interpolation processing unit 13, a coordinates updating unit 14, and an acceleration/deceleration processing unit 15.

An NC program created in order to machine a workpiece W is stored in the memory 10, so as to be retrievable by the instruction analysis unit 11 which is described below.

The instruction analysis unit 11 reads out the NC program from the memory 10, analyzes the program, and if the read out instruction is a normal machining instruction, creates data relating to the amount of movement of an axis which is controlled by the instruction, from the instruction value indicated in the instruction, and the current position of the axis, and outputs the data to the interpolation processing unit 13. On the other hand, when the read out instruction is a cycle machining instruction, then the instruction analysis unit 11 instructs the cycle operation creation unit 12 to create data relating to the amount of movement of the cycle operation, and furthermore, receives the data created by the cycle operation creation unit 12 in accordance with this instruction and transfers the data to the interpolation processing unit 13.

More specifically, the cycle operation creation unit 12 analyzes the cycle machining instruction, if the instruction read out by the instruction analysis unit 11 is a cycle machining instruction, creates data relating to the amount of movement for causing the axis controlled by the cycle machining instruction to perform the cycle operation, and outputs the data to the instruction analysis unit 11.

The interpolation processing unit 13 creates interpolation data (pulses) per unit cycle time from the data relating to the amount of movement received from the instruction analysis unit 11, and the speed instruction value indicated by the machining instruction.

The coordinates updating unit 14 updates the coordinates indicated by the numerical controller 1, on the basis of the interpolation data (pulses) created by the interpolation processing unit 13.

The acceleration/deceleration processing unit 15 applies acceleration or deceleration before transferring the interpolation data (pulses) created by the interpolation processing unit 13 to the servo motor 20, in order to smoothen the movement of the servo motor.

In this way, pulses are output from the numerical controller 1 to the servo motor 20, and the servo motor 20 is driven by these output pulses. The drive of the servo motor 20 is then transmitted via the machine control unit 21, which is a mechanical mechanism, such as a ball screw, and the machine tool operates.

An example of complex fixed cycle control by the numerical controller 1 shown in FIG. 3 is described below.

In this embodiment, a machine tool provided with the cutter holder shown in FIG. 1 is controlled by the numerical controller 1 shown in FIG. 3 and performs a turning according to a complex fixed cycle, reciprocally rather than unidirectionally. In the machine tool provided with cutter holders 31, 32 shown in FIG. 1A and FIG. 1B, the cutter holders 31, 32 are arranged in such a manner that the tools 41, 42 mounted on the cutter holders 31, 32 are mutually opposing, and therefore when a turning in one direction has been completed by one tool 41 (or 42) and this tool is withdrawn, a turning can be carried out in the opposite direction by the other tool 42 (or 41) on the opposite side.

The numerical controller 1 inputs a G code instruction (G900) in the format indicated below, which is one example of a cycle machining instruction for controlling the machine tool provided with the cutter holders 31, 32 shown in FIG. 1, by an NC program. This cycle machining instruction is analyzed as being an instruction for the first tool 41.

G900X_Z_U_L_F_;

X_: X-axis coordinate value of cutting end point A';
Z_: Z-axis coordinate value of cutting end point A';
U_: depth of cut per operation;
L_: distance between tips of first tool 41 and second tool 42;
F_: cutting feed speed FIG. 4 is a diagram illustrating a method for calculating an amount of movement data for each operation calculated by a cycle operation creation unit when the numerical controller in FIG. 3 controls the machine tool shown in FIG. 1, on the basis of values indicated by the cycle machining instructions.

Figure 4:
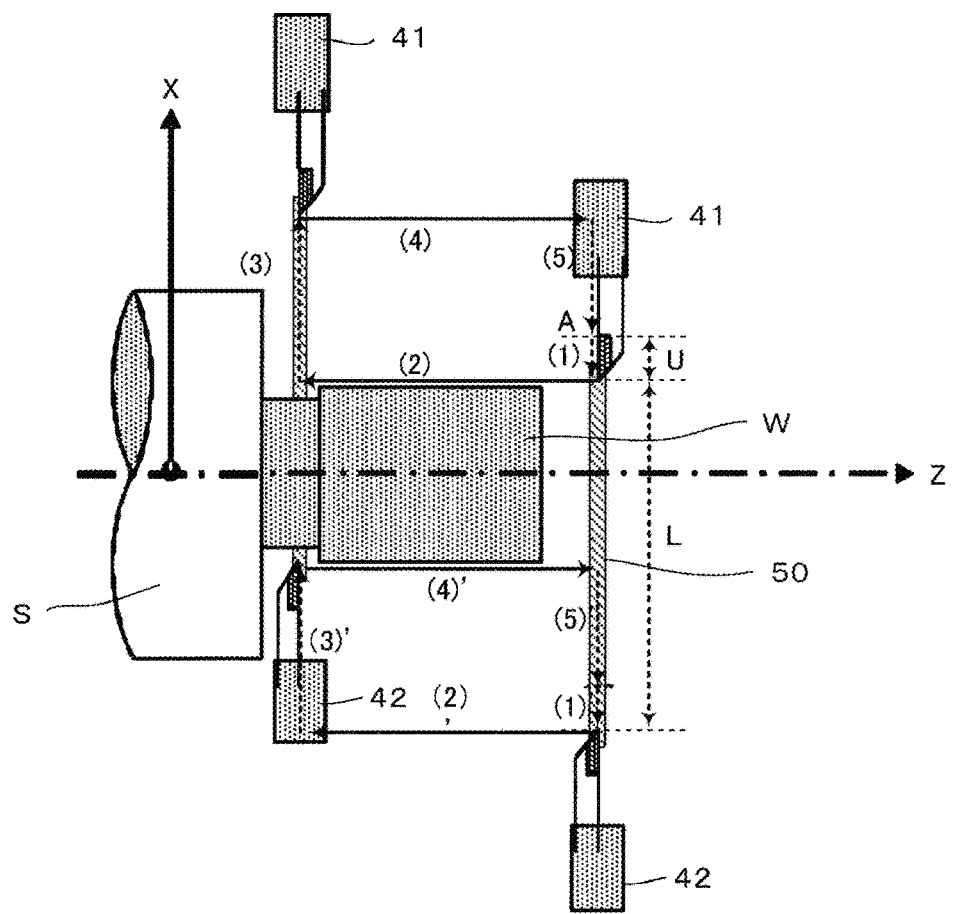
FIG. 4 is a diagram illustrating a method for calculating an amount of movement data for each operation calculated by a cycle operation creation unit when the numerical controller in FIG. 3 controls the machine tool shown in FIG. 1, on the basis of values instructed by the cycle machining instructions.

Here, if the number of cycles of the turning from the start of turning is taken to be n (where the first cycle is n=1, starting from the turning by the first tool 41), and the position of the first tool 41 at the time of issuing the instruction, in other words, the coordinate values of the start point A before cutting into the workpiece W are taken to be A(X), A(Z), then the amounts of movement of the axis (servo motor) in operation (1) to operation (5) of the machine tool shown in FIG. 4 are calculated by formulas (1) to (5) below.

Amount of X-axis movement of first tool 41 to turning start position in operation <1>

$$=-(U \times n) \text{ (where } n=1\text{)} \quad (1)$$

Amount of movement of first tool 41 during turning in operation <2>

$$=Z-A(Z) \quad (2)$$

Amount of X-axis movement of second tool 42 to turning start position in operation <3>

$$=(U \times n)+(L-((A(X)-(U \times n)) \times 2)) \text{ (where } n=1, 2, 3, \ldots) \quad (3)$$

Amount of movement of second tool 42 during turning in operation <4>

$$=AZ-Z \quad (4)$$

Amount of X-axis movement of first tool 41 to turning start position in operation <5> and operation <1>

$$=-(U \times (n+2))-(L-((A(X)-(U \times (n+2))) \times 2)) \text{ (where } n=2, 3, 4, \ldots) \quad (5)$$

Here, the term $(L-((A(X)-(U \times n)) \times 2))$ in formula (3) above which calculates the amount of movement in operation 3 calculates the distance from the second tool 42 to the workpiece W by subtracting the amount of X-axis movement during a cutting incision (since the distance is equal on either side of the Z-axis, then the distance is two times $(A(X)-(U \times n))$, from the distance L between the tips of the first tool 41 and the second tool 42.

The cycle operation creation unit 12 then adjusts the depth of cut in the final stage of the cycle machining to be equal to or less than the depth of cut indicated by the cycle machining instruction described above, and creates amount of movement data whereby the first tool 41 finally arrives at the coordinate values of the cutting end point A', or whereby the X-coordinate value of the second tool 42 reaches the X-coordinate value of a point obtained by moving the cutting end point A' symmetrically with respect to the Z axis.

When the first tool 41 has been positioned at the start point A in FIG. 4, then if a turning is indicated by the cycle machining instruction described above, the numerical controller 1 starts control of the machine tool so as to perform a turning according to the following procedure, on the basis of the respective amounts of movement calculated in formulas (1) to (5).

Step 1: The amount of X-axis movement of the first tool 41 to the start position of the turning is determined by using formula (1) above on the basis of the values instructed by the NC program, and the first tool 41 is controlled so as to advance to the workpiece W through the determined amount of movement, at the fast feed speed ((1)). Simultaneously, the second tool 42 on the opposite side is separated from the workpiece W at the fast feed speed through the same amount of movement, due to the instruction to the first tool 41 ((1)').

Step 2: The amount of Z-axis movement of the first tool 41 during the turning is determined by using formula (2) above on the basis of the values instructed by the NC program, and the first tool 41 is controlled so as to move through the determined amount of movement, at the cutting feed speed, and perform a turning ((2)). Simultaneously, the second tool 42, which is on the opposite side, moves at the cutting speed through the same amount of movement, due to the instruction to the first tool 41. Due to the control described above, the second tool 42 moves to a position before advancing towards the workpiece W, for the purpose of the next process ((2)').

Step 3: The amount of X-axis movement of the second tool 42 to the start position of the turning is determined by using formula (3) above on the basis of the values instructed in the NC program, and the first tool 41 is controlled so as to separate from the workpiece W through the determined amount of movement, at the fast feed speed ((3)). Simultaneously, the second tool 42 on the opposite side is advanced to the workpiece W at the fast feed speed through the same amount of movement, due to the instruction to the first tool 41 ((3)').

Step 4: The amount of Z-axis movement of the second tool 42 during the turning is determined by using formula (4) above on the basis of the values instructed by the NC program, and the first tool 41 is controlled so as to move through the determined amount of movement, at the cutting feed speed ((4)). Simultaneously, the second tool 42 on the opposite side is moved at the cutting feed speed through the same amount of movement, due to the instruction to the first tool 41, and performs a turning ((4)').

Step 5: The amount of movement of the first tool 41 from the current position to the start position of the turning is determined by using formula (5) above on the basis of the values instructed in the NC program, and the first tool 41 is controlled so as to advance to the workpiece W through the determined amount of movement, at the fast feed speed ((5), (1)). Simultaneously, the second tool 42 on the opposite side is separated from the workpiece W at the fast feed speed through the same amount of movement, due to the instruction to the first tool 41 ((5)', (1)').

Thereupon, the steps from step 2 to step 5 are repeated until the first tool 41 reaches the position of the cutting end point A' and the turning ends.

Figure 5:
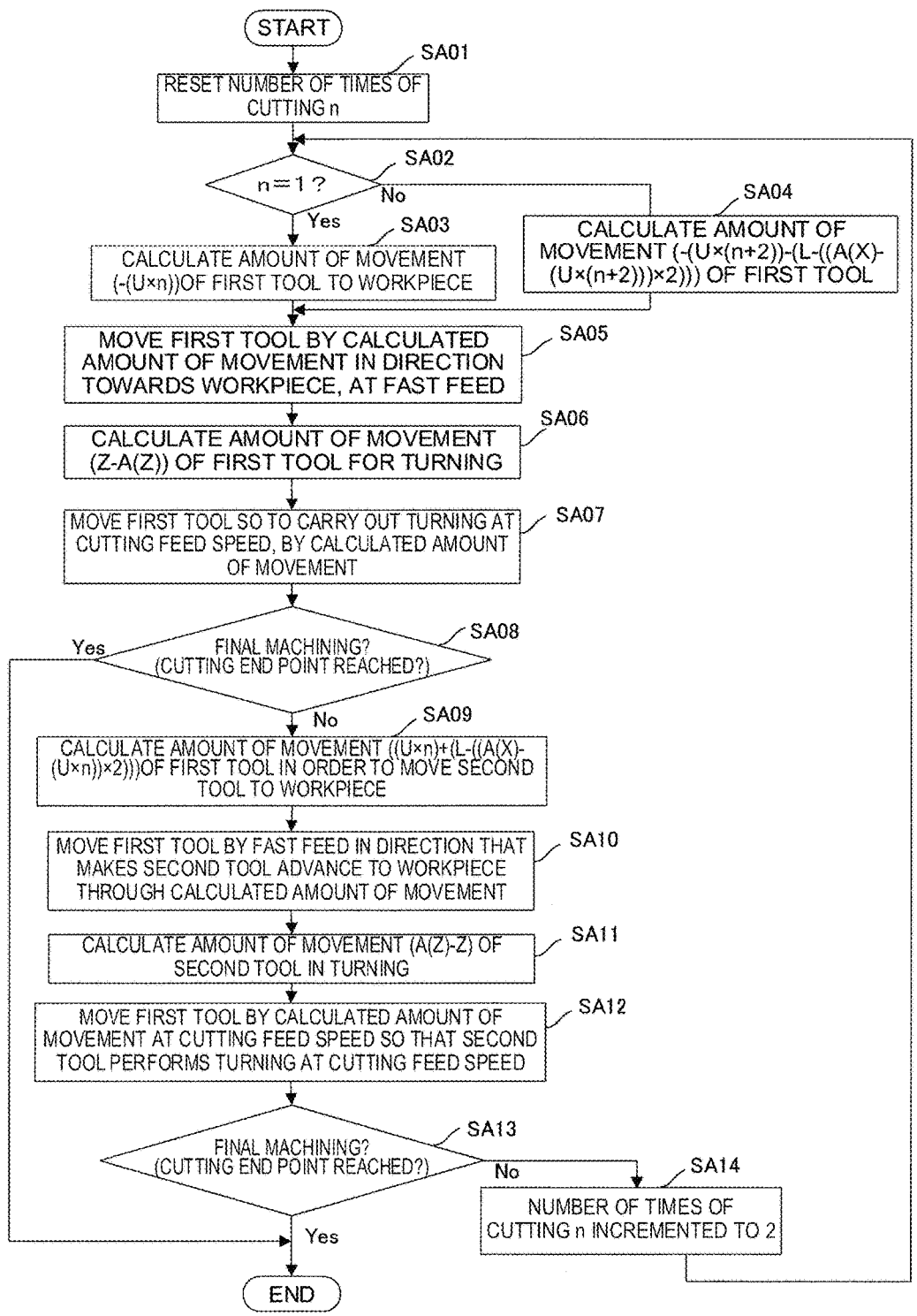
FIG. 5 is a flowchart of a procedure in a turning which is executed in the numerical controller in FIG. 3.

FIG. 5 is a flowchart of the abovementioned procedure in a turning which is executed in a numerical controller 1 according to the present embodiment. This processing is executed by the instruction analysis unit 11 reading out the cycle machining instruction (G900) from the NC program for machining the workpiece W.

[Step SA01] The cycle machining instruction that has been read out is analyzed. Furthermore, the number of times of cutting n is reset to 1.

[Step SA02] It is determined whether or not the number of times of cutting n is 1. If the number of times of cutting n is 1, then the procedure proceeds to step SA03, and if not, then the procedure proceeds to step SA04.

[Step SA03] The amount of movement of the first tool 41 in order to advance to the workpiece W is calculated using formula (1), on the basis of the values indicated by the cycle machining instruction analyzed in step SA01.

[Step SA04] The amount of movement of the first tool 41 in order to advance to the workpiece W is calculated using formula (5), on the basis of the values indicated by the cycle machining instruction analyzed in step SA01.

[Step SA05] The first tool 41 is controlled so as to move in a direction advancing to the workpiece W at the fast feed speed, through the amount of movement calculated in step SA03 or step SA04. Due to this control, the second tool 42, which is on the opposite side, is simultaneously moved in a direction separating from the workpiece W at the fast feed speed, through the same amount of movement.

[Step SA06] The amount of movement of the first tool 41 in the turning is calculated using formula (2), on the basis of the values indicated by the cycle machining instruction analyzed in step SA01.

[Step SA07] The first tool 41 is controlled so as to move at the cutting feed speed through the amount of movement calculated in step SA06, thereby performing a turning. Due to this control, the second tool 42, which is on the opposite side, is simultaneously moved at the cutting feed speed, through the same amount of movement.

[Step SA08] It is determined whether or not the final machining has been completed (whether or not the coordinates of the cutting end point A' have been reached). If the final machining has been completed, then this processing is terminated, and if the final machining has not been completed, then the procedure proceeds to step SA09.

[Step SA09] The amount of movement of the second tool 42 in order to advance to the workpiece W is calculated using formula (3), on the basis of the values indicated by the cycle machining instruction analyzed in step SA01.

[Step SA10] The first tool 41 is controlled so as to move in a direction away from the workpiece W at the fast feed speed, in order that the second tool 42 advances to the workpiece W through the amount of movement calculated in step SA09. Due to this control, the second tool 42, which is on the opposite side, is simultaneously moved in a direction advancing to the workpiece W at the fast feed speed, through the same amount of movement.

[Step SA11] The amount of movement of the second tool 42 in the turning is calculated using formula (4), on the basis of the values indicated by the cycle machining instruction analyzed in step SA01.

[Step SA12] The first tool 41 is controlled so as to move at the cutting feed speed through the amount of movement calculated in step SA11, in order that the second tool 42 performs a turning by moving at the cutting feed speed through that amount of movement. Due to this control, the second tool 42, which is on the opposite side, is simultaneously moved at the cutting feed speed, through the same amount of movement, and performs a turning.

[Step SA13] It is determined whether or not the final machining has been completed (whether or not the X-coordinate value of the point obtained by moving the position of the second tool 42 symmetrically with respect to the Z axis has reached the X-coordinate value of the cutting end point A'). If the final machining has been completed, then this processing is terminated, and if the final machining has not been completed, then the procedure proceeds to step SA14.

[Step SA14] The number of times of cutting n is incremented to 2, and the procedure returns to step SA02.

As described above, the numerical controller 1 according to the present embodiment can reduce the movement of the tool to the minimum necessary amount since control is implemented in the machine tool shown in FIG. 1, in which the mounted tools are arranged in opposing fashion, so as to perform a turning according to a complex fixed cycle in a reciprocal fashion, and therefore the cycle time of the complex fixed cycle can be shortened.

Next, the numerical controller according to a second embodiment of the present invention will be described with reference to FIG. 6A, FIG. 6B and FIG. 7.

Figure 6A:
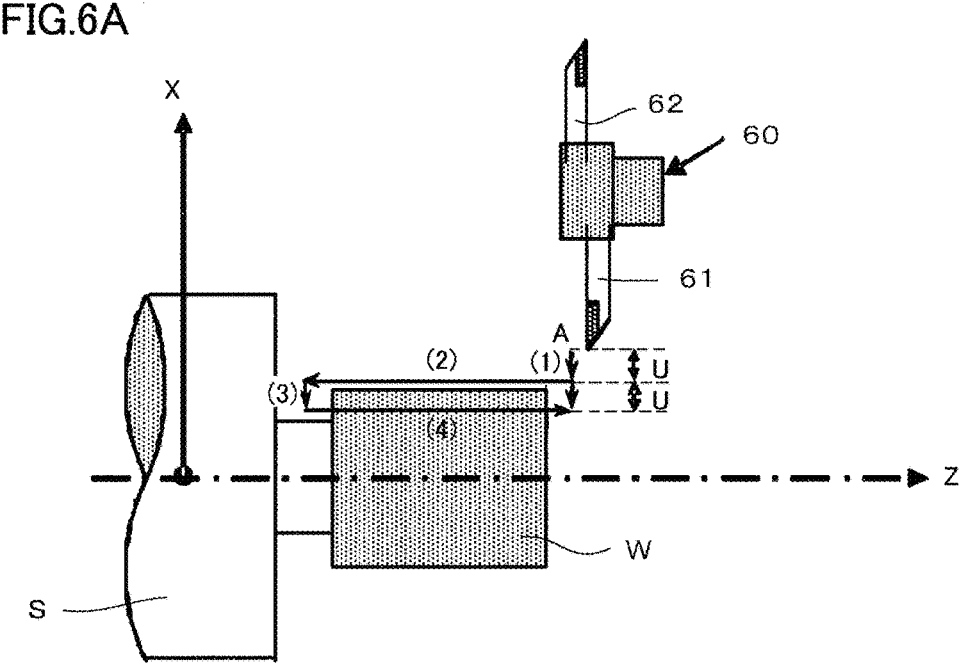
FIGS. 6A and 6B are drawings showing an overview of a cycle operation which is controlled by a numerical controller according to a second embodiment of the present invention.
Figure 6B:
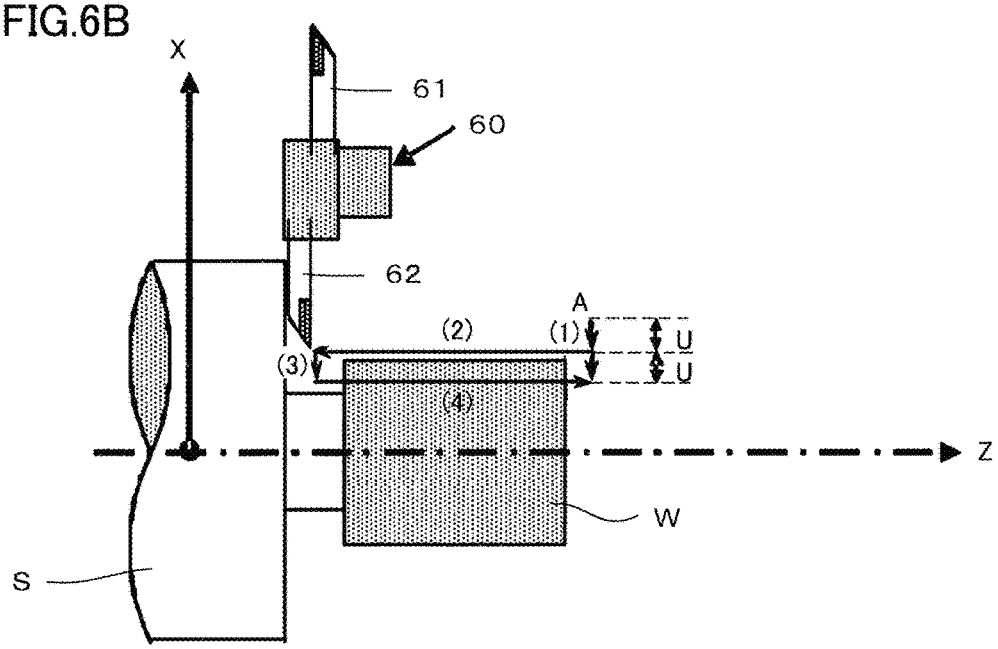

The numerical controller according to the first embodiment described above controls a machine tool provided with cutter holders 31, 32 which are arranged in such a manner that the tools 41, 42 mounted therein are mutually opposing, as shown in FIG. 1, but the numerical controller according to this second embodiment controls a machine tool provided with a tool mounted on a turret, as shown in FIG. 6A and FIG. 6B.

As shown in FIG. 6A and FIG. 6B, the machine tool which is controlled by the numerical controller according to the present embodiment is provided with a rotating turret 60 on which first and second tools 61, 62 are mounted in such a manner that the directions of turning thereof are mutually opposite, and this turret 60 is controlled so as to respectively rotate and be clamped in the rotation position in FIG. 6A, when a turning is being performed by the first tool 61, and in the rotation position in FIG. 6B, when a turning is being performed by the second tool 62. Thus the rotating turret 60 is caused to rotate to the rotation position to index a tool. The numerical controller controls the machine tool in such a manner that a turning according to a complex fixed cycle is performed reciprocally using the first and second tools 61, 62, by controlling the X-Z coordinates position and the angle of rotation of the turret 60.

To describe the operation for reciprocally performing a turning according to a complex fixed cycle by the numerical controller, with reference to FIG. 6A and FIG. 6B, firstly, the turret 60 is clamped at a rotational position which enables a cutting by the first tool 61, and the tip of the first tool 61 is positioned at the start point A and advanced to the workpiece W ((1) in FIG. 6A), and the Z coordinate of the first tool 61 is then moved until the Z coordinate value of the cutting end point, thereby performing a turning ((2) in FIG. 6A).

Next, the turret 60 is rotated at the end point of the cutting operation (2) in FIG. 6A, and is clamped in a rotational position where the second tool 62 can be used for a turning (FIG. 6B). Thereupon, the second tool 62 is moved in the direction of the workpiece W, through the depth of cut ((3) in FIG. 6B), and the second tool 62 is moved in the opposite direction to (2) in FIG. 6A, in the Z axis direction ((4) in FIG. 6B), thereby the turning is performed. The first tool 61 and the second tool 62 have the same length.

In the present embodiment, the numerical controller inputs a G code instruction (G900) in the format indicated below, which is one example of a cycle machining instruction for controlling the machine tool provided with the cutter holders shown in FIGS. 6A and 6B, by an NC program. The cycle machining instruction introduced in the present embodiment is analyzed as being an instruction for the first tool 61.

G900 X_Z_U_F_;
X_: X-axis coordinate value of cutting end point A';
Z_: Z-axis coordinate value of cutting end point A';
U_: amount of depth of cut per operation
F_: cutting feed speed The principal block diagram of the numerical controller according to the second embodiment of the present invention, which causes operation of the machine tool shown in FIG. 6A and FIG. 6B, is similar to the principal block diagram of the numerical controller according to the first embodiment of the present invention, which causes operation of the machine tool shown in FIG. 1A and FIG. 1B.

The cycle operation creation unit 12 of the numerical controller 1 calculates the amount of movement of the feed operations in (1) to (4) shown in FIG. 6A and FIG. 6B, on the basis of the values indicated by the cycle machining instruction described above. Here, if the number of cycles of the turning from the start of turning is taken to be n (where the first cycle is n=1, starting from the turning by the first tool 61), and the position of the first tool 61 at the time of the instruction, in other words, the coordinate values of the start point A before cutting into the workpiece W are taken to be A(X), A(Z), then the amounts of movement of the axis (servo motor) in operation (1) to operation (4) of the tool shown in FIGS. 6A and 6B are calculated by formulas (6) to (9) below.

Amount of X-axis movement of first tool 61 to turning start position in operation <1>

$$=-(U \times n) \text{ (where n=1)} \qquad (6)$$

Amount of movement of first tool 61 during turning in operation <2>

$$=Z-A(Z) \qquad (7)$$

Amount of X-axis movement of second tool 62 to turning start position in operation <3>

$$=-(U \times (n+1)) \text{ (where n=1, 2, 3,)} \qquad (8)$$

Amount of movement of second tool 62 during turning in operation <4>

$$=A(Z)-Z \qquad (9)$$

The cycle operation creation unit 12 creates amount of movement data by adjusting the depth of cut in the final stage of the cycle process to be equal to or less than the depth of cut instruction by the cycle machining instruction, in such a manner that the first tool 61 arrives finally at the coordinate values of the cutting end point A'.

When the first tool 61 has been positioned at the start point A in FIG. 6A, then if a turning is instructed by the cycle machining instruction described above, the numerical controller 1 starts control of the machine tool so as to perform a turning according to the following procedure, on the basis of the respective amounts of movement calculated in formulas (6) to (9).

- Step 1: The amount of X-axis movement of the first tool 61 to the start position of the turning is determined by using formula (6) above on the basis of the values instructed by the NC program, and the first tool 61 is controlled so as to advance to the workpiece W through the determined amount of movement, at the fast feed speed ((1) in FIG. 6A).
- Step 2: The amount of Z-axis movement of the first tool 61 during the turning is determined by using formula (7) above on the basis of the values instructed by the NC program, and the first tool 61 is controlled so as to move through the determined amount of movement, at the cutting feed speed, and perform a turning ((2) in FIG. 6A).
- Step 3: When it is detected in step 2 that the Z axis has reached the Z coordinate value of the cutting end point of the turning, then the turret 60 is unclamped, a rotary shaft connected to the turret 60 is rotated to a position which enables a turning by the second tool 62 (FIG. 6B), and the turret is clamped again.
- Step 4: The amount of X-axis movement of the second tool 62 to the start position of the turning is determined by using formula (8) above on the basis of the values instructed in the NC program, and the second tool 62 is controlled so as to advance to the workpiece W through the determined amount of movement, at the fast feed speed ((3) in FIG. 6B).
- Step 5: The amount of Z-axis movement of the second tool 62 during the turning is determined by using formula (9) above on the basis of the value instructed by the NC program, and the second tool 62 is controlled so as to move through the determined amount of movement, at the cutting feed speed, and perform a turning ((4) in FIG. 6B).
- Step 6: When it is detected in step 5 that the Z axis has reached the start point of the turning, then the turret 60 is unclamped, the rotary shaft connected to the turret 60 is rotated to a position which enables a turning by the first tool 61 (FIG. 6A), and the turret is clamped again.

Thereafter, step 2 to step 6 are repeated until the turning is completed.

Figure 7:
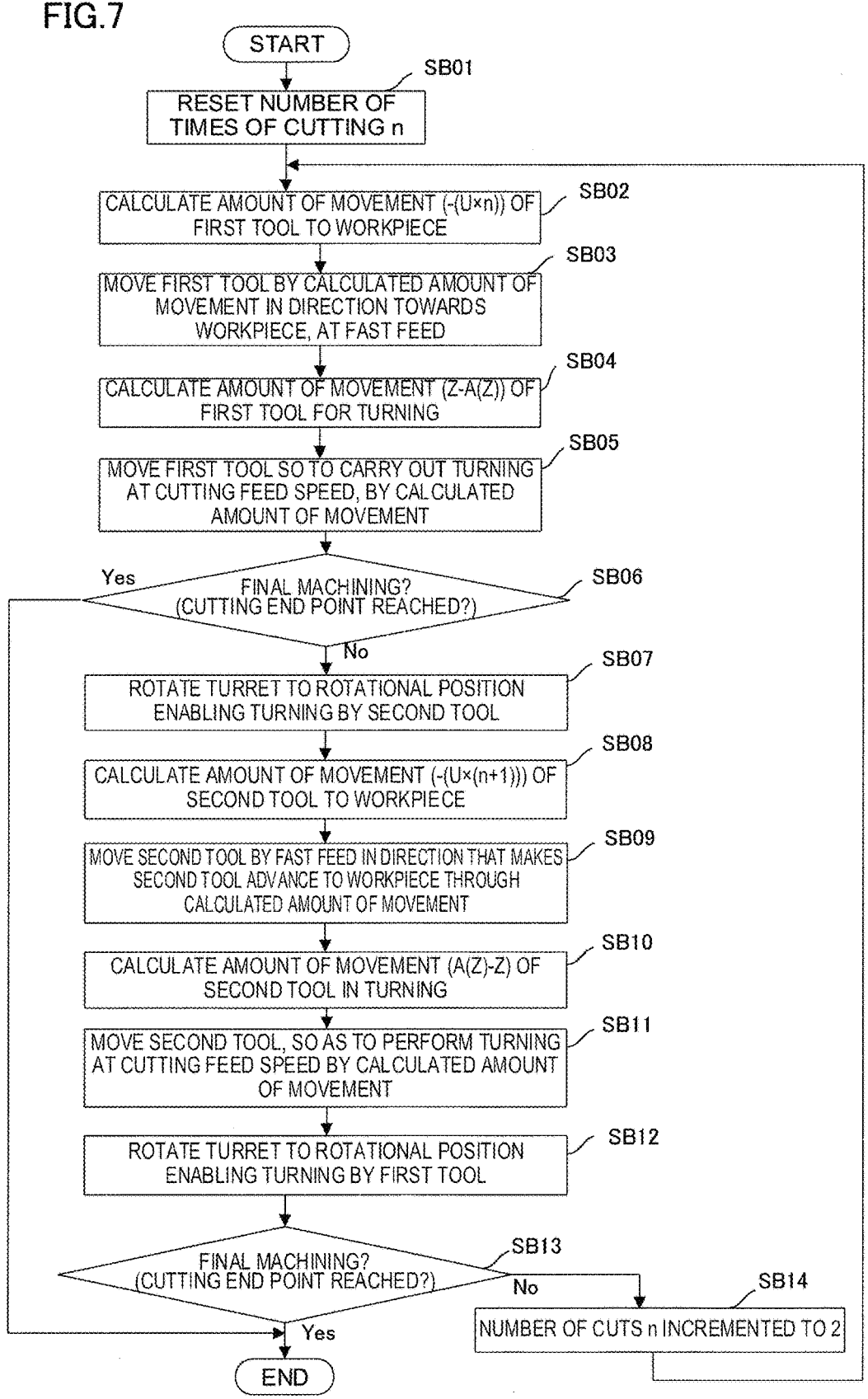
FIG. 7 is a flowchart showing a procedure in a turning which is executed in the numerical controller according to the second embodiment of the present invention.

FIG. 7 is a flowchart of the abovementioned procedure in a turning which is executed in a numerical controller 1 according to the present embodiment. This processing is executed by the instruction analysis unit 11 reading out the cycle machining instruction (G900) from the NC program for machining the workpiece W.

- [Step SB01] The cycle machining instruction that has been read out is analyzed. Furthermore, the number of times of cutting n is reset to 1.
- [Step SB02] The amount of movement of the first tool 61 in order to advance to the workpiece W is calculated using formula (6), on the basis of the values indicated by the cycle machining instruction analyzed in step SB01.
- [Step SB03] The first tool 61 is controlled so as to move in a direction advancing to the workpiece W at the fast feed speed, through the amount of movement calculated in step SB02.
- [Step SB04] The amount of movement of the first tool 61 in the turning is calculated using formula (7), on the basis of the values indicated by the cycle machining instruction analyzed in step SB01.
- [Step SB05] The first tool 61 is controlled so as to move at the cutting feed speed through the amount of movement calculated in step SB04, thereby performing a turning.
- [Step SB06] When it is detected that the Z axis has reached the Z-coordinate value of the cutting end point of the turning in step SB05, then it is determined whether or not the final machining has been completed (whether or not the coordinates of the cutting end point A' have been reached). If the final machining has been completed, then this processing is terminated, and if the final machining has not been completed, then the procedure proceeds to step SB07.
- [Step SB07] The turret 60 is unclamped, the rotary shaft connected to the turret 60 is rotated to a rotational position which enables a turning by the second tool 62, and the turret 60 is clamped again.
- [Step SB08] The amount of movement of the second tool 62 in order to advance to the workpiece W is calculated using formula (8), on the basis of the values indicated by the cycle machining instruction analyzed in step SB01.
- [Step SB09] The second tool 62 is controlled so as to move in a direction advancing to the workpiece W at the fast feed speed, through the amount of movement calculated in step SB08.
- [Step SB10] The amount of movement of the second tool 62 in the turning is calculated using formula (9), on the basis of the values indicated by the cycle machining instruction analyzed in step SB01.
- [Step SB11] The second tool 62 is controlled so as to move at the cutting feed speed through the amount of movement calculated in step SB10, thereby performing a turning.
- [Step SB12] When it is detected in step SB11 that the Z axis has reached the start point of the turning, then the turret 60 is unclamped, the rotary shaft connected to the turret 60 is rotated to a position which enables a turning by the first tool 61, and the turret is clamped again.
- [Step SB13] It is determined whether or not the final machining has been completed (whether or not the X-coordinate value of the second tool 62 has reached the X-coordinate value of the cutting end point A'). If the final machining has been completed, then this processing is terminated, and if the final machining has not been completed, then the procedure proceeds to step SB14.
- [Step SB14] The number of times of cutting n is 1 incremented to 2, and the procedure returns to step SB02.

As described above, the numerical controller 1 according to the present embodiment can reduce the movement of the tool to the minimum necessary amount since control is implemented in the machine tool shown in FIGS. 6A and 6B which is provided with a rotating turret 60, on which a first and a second tool 61, 62 are mounted in such a manner that the directions of turning thereof are mutually opposite, so as to perform a turning according to a complex fixed cycle in a reciprocal fashion, and therefore the cycle time of the complex fixed cycle can be shortened.

Next, the numerical controller according to a third embodiment of the present invention will be described with reference to FIG. 8A and FIG. 8B.

Figure 8A:
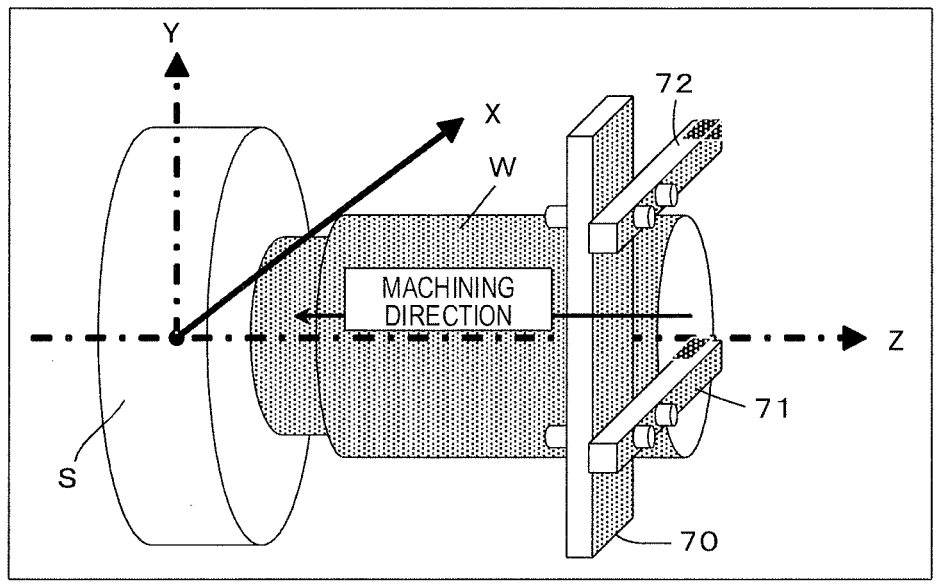
FIGS. 8A and 8B are drawings showing an overview of a cycle operation which is controlled by a numerical controller according to a third embodiment of the present invention.
Figure 8B:
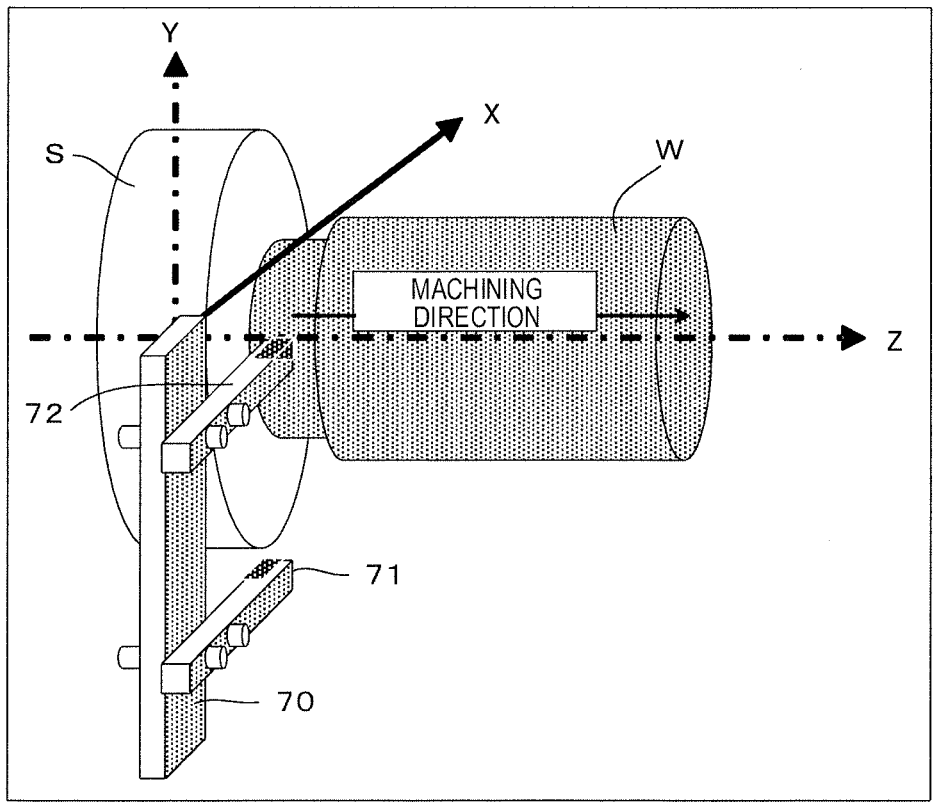

The numerical controller according to this third embodiment controls a machine tool of a type in which a first tool 71 and a second tool 72 are mounted on a tandem type cutter holder 70, as shown in FIG. 8A and FIG. 8B.

More specifically, in the machine tool shown in FIGS. 8A and 8B, the first tool 71 and the second tool 72, which have the same tool length, are mounted at positions forming a tandem configuration on the cutter holder 70, in such a manner that the directions of turning thereof are mutually opposite. When the machine tool of this kind is controlled by the numerical controller, after positioning the first tool 71 at the start point as shown in FIG. 8A, a turning is performed by the first tool 71. The second tool 72 is then indexed by driving the cutter holder 70 to position the second tool 72 at the start point as shown in FIG. 8B where a turning is performed by the second tool 72. Thus the cutter holder 70 is caused to index a tool.

By moving the cutter holder in the Y axis direction and performing a turning in the opposite direction by the second tool 72, when the turning by the first tool 71 has been completed, it is possible to perform a turning according to a complex fixed cycle in a reciprocal fashion, using the first tool 71 and the second tool 72, similarly to the first and second embodiments described above.

Embodiments of the present invention have been described above, but the present invention is not limited to the embodiments described above and can be implemented in various modes by applying suitable modifications.

For example, in the first and second embodiments, the first and second tools are mounted on cutter holders or a turret in such a manner that the tip positions of the tools coincide in respect of the Z-axis coordinate, but even if the Z-axis coordinates of the tip positions of the first and second tools do not coincide, the difference between the Z-axis coordinates of the tip positions of the tools is set in a setting region of the numerical controller as a correction value, and this correction value can be used to resolve the abovementioned difference by correcting the amounts of movement in the respective operations. Furthermore, even if the lengths of the tools are different, it is similarly possible to resolve this difference by correcting the amount of movement on the basis of the difference in the tool lengths.

The invention claimed is:

1. A numerical controller that controls a machine tool that performs a turning on a workpiece on the basis of a cycle instruction indicated by an NC program, wherein the machine tool comprises:
   a first tool that performs a turning on the workpiece while moving in a first machining direction;
   a second tool that performs a turning on the workpiece while moving in a second machining direction opposite to the first machining direction; and
   a tool switching unit that switches, based on an instruction from the numerical controller, the tool used for a turning to an instructed tool, from among the first tool and the second tool, and establishes a state where a turning can be implemented by the tool,
   the numerical controller comprises a cycle operation creation unit that creates, on the basis of the cycle instruction, a cycle operation for instruction to the machine tool, and
   the cycle operation is an operation that repeats a reciprocal turning operation including:
   a first operation for performing a turning in the first machining direction by the first tool;
   a second operation for switching from the first tool to the second tool by the tool switching unit;
   a third operation for performing a turning in the second machining direction by the second tool; and
   a fourth operation for switching from the second tool to the first tool by the tool switching unit.

2. The numerical controller according to claim 1, wherein the tool switching unit is configured by:
   a first cutter holder on which the first tool is mounted;
   a second cutter holder on which the second tool is mounted;
   a coupling member that couples the first cutter holder and the second cutter holder in such a manner that the first tool and the second tool are arranged in substantially opposing fashion on either side of the axis of a spindle that causes the workpiece to rotate; and
   a motor that drives the first cutter holder and the second cutter holder in a direction substantially perpendicular to the axis of the spindle;
   the second operation is an operation for causing the second tool to move to a position where the workpiece is to be machined, by moving the first tool away from the workpiece; and
   the fourth operation is an operation for causing the first tool to move to a position where the workpiece is to be machined, by moving the second tool away from the workpiece.

3. The numerical controller according to claim 1, wherein the tool switching unit is configured by:
   a turret on which the first tool and the second tool are mounted; and
   a motor that drives the turret;
   the second operation is an operation of indexing the second tool by rotating the turret and then moving the second tool to a position where the workpiece is to be machined; and
   the fourth operation is an operation of indexing the first tool by rotating the turret and then moving the first tool to a position where the workpiece is to be machined.

4. The numerical controller according to claim 1, wherein the tool switching unit is configured by a tandem cutter holder on which the first tool and the second tool are mounted, and a drive unit that drives the tandem cutter holder,
   the second operation is an operation of indexing the second tool by driving the tandem cutter holder and then moving the second tool to a position where the workpiece is to be machined, and
   the fourth operation is an operation of indexing the first tool by driving the tandem cutter holder and then moving the first tool to a position where the workpiece is to be machined.

* * * * *